US009282150B2

(12) United States Patent
Wood

(10) Patent No.: US 9,282,150 B2
(45) Date of Patent: Mar. 8, 2016

(54) METHOD FOR ALLOCATION OF NETWORK RESOURCES IN AN OPERATIONS NETWORK FOR A SELECTED ENVIRONMENT

(71) Applicant: GE Aviation Systems Limited, Cheltenham (GB)

(72) Inventor: Timothy John Wood, Stroud (GB)

(73) Assignee: GE AVIATION SYSTEMS LIMITED, Cheltenham (GB)

( * ) Notice: Subject to any disclaimer, the term of this patent is extended or adjusted under 35 U.S.C. 154(b) by 535 days.

(21) Appl. No.: 13/722,312

(22) Filed: Dec. 20, 2012

(65) Prior Publication Data
US 2014/0059230 A1    Feb. 27, 2014

(30) Foreign Application Priority Data
Aug. 22, 2012  (GB) .................................... 12149183

(51) Int. Cl.
*G06F 15/173* (2006.01)
*G06F 15/16* (2006.01)
*H04L 29/08* (2006.01)
*H04L 12/927* (2013.01)

(52) U.S. Cl.
CPC .............. *H04L 67/12* (2013.01); *H04L 47/803* (2013.01)

(58) Field of Classification Search
CPC combination set(s) only.
See application file for complete search history.

(56) References Cited

U.S. PATENT DOCUMENTS

| 2,318,834 | A | | 5/1943 | Birkigt |
| 4,470,116 | A | * | 9/1984 | Ratchford .................... 701/33.4 |
| 4,621,335 | A | * | 11/1986 | Bluish et al. .................. 340/945 |
| 5,673,393 | A | | 9/1997 | Marshall et al. |
| 6,314,343 | B1 | * | 11/2001 | Adams et al. ..................... 701/3 |
| 7,385,997 | B2 | | 6/2008 | Gorti et al. |
| 8,194,573 | B1 | * | 6/2012 | Smith et al. ................... 370/255 |
| 2004/0184461 | A1 | | 9/2004 | Forssell et al. |
| 2008/0298241 | A1 | | 12/2008 | Ohana et al. |
| 2009/0083747 | A1 | * | 3/2009 | Huang et al. .................. 718/104 |
| 2010/0267375 | A1 | * | 10/2010 | Lemmon et al. .............. 455/418 |
| 2011/0235527 | A1 | * | 9/2011 | Buse et al. ..................... 370/242 |
| 2012/0151195 | A1 | * | 6/2012 | Damblemont et al. ........... 713/1 |
| 2012/0156653 | A1 | * | 6/2012 | Wokurka ......................... 434/30 |
| 2012/0216037 | A1 | * | 8/2012 | Simcoe et al. ................ 713/168 |

FOREIGN PATENT DOCUMENTS

WO    2005046145 A1    5/2005
WO    2009123664 A1    10/2009

OTHER PUBLICATIONS

Combined Search and Examination Report issued in connection with corresponding GB Application No. GB1214918.3 dated Dec. 11, 2012.

* cited by examiner

*Primary Examiner* — Saket K Daftuar
(74) *Attorney, Agent, or Firm* — GE Global Patent Operation; William S. Munnerlyn

(57) ABSTRACT

A method for allocation of network resources in an operations network for a selected environment includes, among other things, a plurality of applications communicating over a network having a bandwidth capacity and a plurality of modes including at least a first mode and a second mode.

19 Claims, 3 Drawing Sheets

Network Traffic Bandwidth Allocation (% link utilisation) 200

| Function | MODE | App #1 | App #2 | App #3 | App #4 | Unit #1 | Unit #2 | Unit #3 | Unit #4 | Other App #1 | Other App #2 |
|---|---|---|---|---|---|---|---|---|---|---|---|
| App #1 | 1 | | 2 | 1 | 3 | 2 | 2 | 3 | | 6 | 8 |
| App #1 | 2 | | 2 | 1 | 3 | 2 | 2 | 3 | | 6 | 8 |
| App #2 | 1 | 2 | | 1 | 1 | 2 | 6 | 0 | | 6 | 2 |
| App #2 | 2 | 2 | | 1 | 1 | 2 | 6 | 0 | | 9 | 2 |
| App #3 | 1 | 4 | 2 | | 2 | 1 | 1 | 1 | | 8 | 7 |
| App #3 | 2 | 4 | 2 | | 2 | 1 | 1 | 1 | | 8 | 7 |
| App #4 | 1 | 2 | 1 | 0 | | 0 | 1 | 2 | | 2 | 2 |
| App #4 | 2 | 2 | 1 | 0 | | 0 | 1 | 2 | | 2 | 2 |
| Unit #1 | 1 | 4 | 2 | 3 | 2 | | 2 | 2 | | 3 | 3 |
| Unit #1 | 2 | 4 | 2 | 3 | 6 | | 2 | 2 | | 3 | 3 |
| Unit #2 | 1 | 2 | 1 | 1 | 2 | 2 | | 2 | | 2 | 2 |
| Unit #2 | 2 | 0 | 1 | 1 | 0 | 2 | | 2 | | 2 | 2 |
| Unit #3 | 1 | 1 | 2 | 2 | 2 | 2 | 2 | | | 3 | 3 |
| Unit #3 | 2 | 2 | 2 | 2 | 2 | 2 | 2 | | | 3 | 3 |
| Unit #4 | 1 | 2 | 2 | 2 | 4 | 3 | 3 | 3 | | 3 | 3 |
| Unit #4 | 2 | 5 | 2 | 7 | | 3 | 3 | 3 | | 3 | 3 |
| Other Systems #1 | 1 | 0 | 11 | 14 | 1 | | | | | | |
| Other Systems #1 | 2 | 4 | | 7 | | | | | | | |
| Other Systems #2 | 1 | 5 | | | 3 | | | | | | |
| Other Systems #2 | 2 | 7 | 1 | 9 | 8 | | | | | | |
| Sub-totals | 1 | 24 | 17 | 24 | 19 | 17 | 22 | 18 | | 50 | 40 |
| Sub-totals | 2 | 22 | 22 | 22 | 23 | 17 | 22 | 18 | | 50 | 40 |
| Processing Sub-totals | 1 | 84 | | | | | | 363 | | 87 | 71 |
| Processing Sub-totals | 2 | 89 | | | | | | 368 | | 87 | 71 |
| Application Aggregate | 1 | | | | | | | | | | |
| Application Aggregate | 2 | | | | | | | | | | |

Transmitters (210, 212, 214, 216)
Receivers (218)
220, 222

FIG. 3

METHOD FOR ALLOCATION OF NETWORK RESOURCES IN AN OPERATIONS NETWORK FOR A SELECTED ENVIRONMENT

CROSS-REFERENCE TO RELATED APPLICATIONS

This application claims priority under 35 U.S.C. §119 to British Patent Application No. 12149183, filed Aug. 22, 2012, the disclosure of which is incorporated herein by reference.

BACKGROUND OF THE INVENTION

The currently accepted method for creating a deterministic operations network, as is used for applications in a selected environment such as an aircraft and on-the-ground support for the aircraft, is to allocate network resources to traffic flows generated by connected systems. The network resources are typically allocated in the form of reserved network bandwidth; either by defining dedicated, fixed size time slots or by defining a traffic rate in terms of bytes or frames per second. Currently accepted strategies for allocating network resources favor essential functions over non-essential functions when allocating the finite set of network resources with the consequence that less essential functions, which might only operate under certain well defined conditions, are either severely restricted or are eliminated entirely. Past attempts to accommodate different operating modes have required changes to the configuration of the network to match the different modes, each of which allocates less than the aggregate of available resources.

BRIEF DESCRIPTION OF THE INVENTION

In one embodiment, the invention relates to a method for allocation of network resources in an operations network for a selected environment. The operations network comprises a plurality of applications communicating over a network having a bandwidth capacity, wherein the aircraft operates in a plurality of modes, a first mode being an in-flight mode and a second mode being an on-the-ground maintenance mode. The method comprises the steps of determining a set of first preferred applications of the plurality of applications communicating over the network in the first mode and a set of second preferred applications of the plurality of applications communicating over the network in the second mode; allocating a first portion of the network resources to the set of first preferred applications in the first mode and a second portion of the network resources to the set of second preferred applications in the second mode; and operating the network with preference given to the first set of preferred applications when the aircraft is operating in the first mode of operation and to the second set of preferred applications when the aircraft is operating in the second mode of operation.

BRIEF DESCRIPTION OF THE DRAWINGS

In the drawings:

FIG. 3 is a chart illustrating an example of allocating resources in an aircraft operations network according to yet another embodiment of the invention.

DESCRIPTION OF EMBODIMENTS OF THE INVENTION

With reference to the figures, the invention relates to a method for allocation of network resources in an operations network for a selected environment. The selected environment described herein is for an aircraft, such as a commercial jet airliner, but it will be understood that the invention is equally applicable to other selected environments that require an operations network to control bandwidth over a network in multiple modes. For example, the selected environment could be another type of vehicle, such as a car, boat, bus, train and the like. The selected environment could also be a building, such as an office building or wastewater treatment plant, or even a general interconnected network which requires its operation to be selectable among multiple modes.

The multiple modes are shown in this specification as modes representative of a need to transmit and prioritize safety-critical data in a first mode, such as an in-flight aircraft mode, and a second mode, requiring more bandwidth to transmit less safety-critical, yet time-critical, information such as an aircraft passenger manifest or aircraft maintenance information. It will be understood that the examples shown herein are discussed by way of example and illustration of the invention and should not be interpreted as limiting on the construction of the claims appended hereto or limiting on the scope of the invention.

Figure 1:
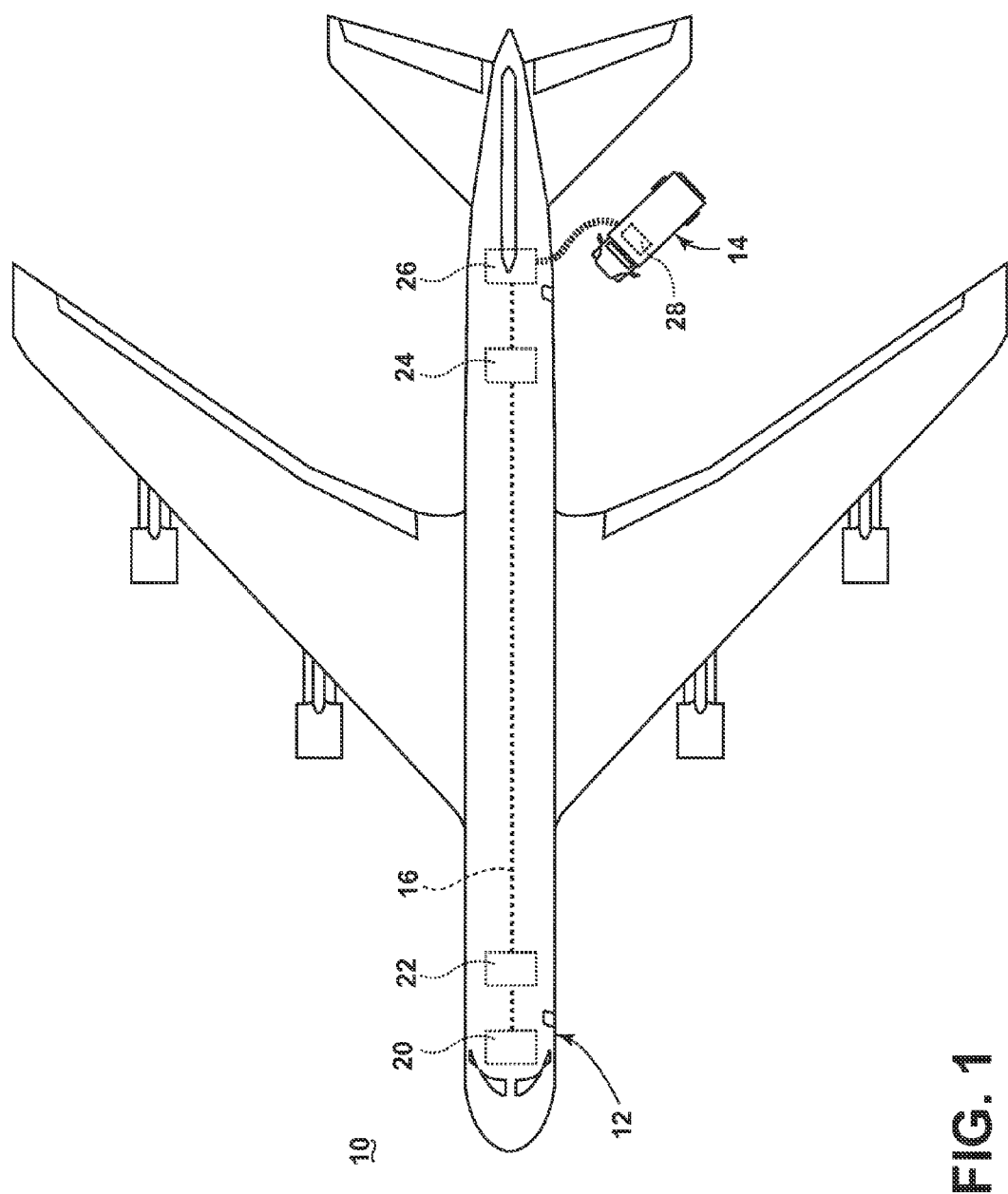
FIG. 1 is a schematic illustration of an aircraft on the ground with a maintenance vehicle communicating data across a network of applications according to one embodiment of the invention.

FIG. 1 is a schematic illustration of an aircraft 12 on the ground with a maintenance vehicle 14 communicating data across a network 16 of applications 20, 22, 24, 26, 28 according to one embodiment of the invention, where applications may be a computer-implemented process such as a service, a process, a batch, or an executable or a system of applications. A system integrator, that is, the person or company that brings together component subsystems or applications into a whole and ensures that those applications function together, may assign applications 20, 22, 24, 26, 28 to the aircraft operations network 16 and, based on the data flow requirements of the applications 20, 22, 24, 26, 28 may allocate network resources to the applications 20, 22, 24, 26, 28 in a dedicated manner. In order to provide assured behavior and performance, the application provider, that is the persons or companies that provide the component subsystems or applications to the aircraft, may design the applications 20, 22, 24, 26, 28 to expect access to the network resources at all times and may implement system monitoring functions like timers and retry mechanisms that are based on the guarantee of the allocated network resources. Any degradation in the level of network service may manifest as a system fault condition affecting the ability of the application to perform its intended function. The system integrator may, therefore, define a network allocation that provides dedicated resources to each application of the network at all times in order to ensure correct operation of all applications of the network 16. The totality of network resources allocated in this manner to all applications may exceed the total available network resources; however, at any given time the aggregate network allocation in use does not exceed the total available network resources.

According to an embodiment of the invention, the use of a deterministic data network 16 used as part of a safety critical computing platform such as an aircraft 12 may enhance data communication to network connected applications 20, 22, 24,

26, 28 such as, but not limited to, maintenance operations where an on-the-ground ground maintenance vehicle 14 may transfer data with an application 28 to and from the aircraft applications 20, 22, 24, 26 through the aircraft operations network 16. The application 28 at the maintenance vehicle 14 may use a greater proportion of the available network resources while the aircraft operations network 16 is in a restricted operating mode than would be available under normal operating conditions such as when the aircraft is in-flight or taxiing.

The operations of the aircraft 12 may be configured for a first mode with normal aircraft operating conditions where a set of preferred applications 20, 22 are operational but where a second set of applications 26, 28 may be disabled. One such first mode may be for the aircraft 12 in-flight. A second mode may be for the maintenance such as when the aircraft 12 is on the ground and second set of applications 26, 28 may be preferred. In the maintenance mode, the aircraft operations may enable and prioritize applications 26, 28 to maximize the use of network resources for transmitting maintenance data including, but not limited to, flight data, engine condition monitoring data, recorder logs, and passenger manifest data. In an another embodiment of the invention, the operations of the aircraft 12 may be configured where a set of preferred applications at 20 are always operational, a second set of applications 26, 28 may be disabled in a first mode of operations and third set of applications may be disabled in a second mode of operations. Other modes may be used depending upon the implementation.

During a normal, high integrity mode such as aircraft in-flight, established mechanisms may be used to ensure that the network traffic for nonessential applications remains disabled and that the network performance, often referred to as the Quality of Service, is maintained such that the platform operates in a manner consistent with all safety and performance requirements for the platform. Examples of established mechanisms include, but are not limited to, a hardware interlock and a logical interlock to the operating the aircraft operations network 16 with preference given to safety critical applications when the aircraft is operating in the high integrity mode of operation such as in-flight.

Figure 2:
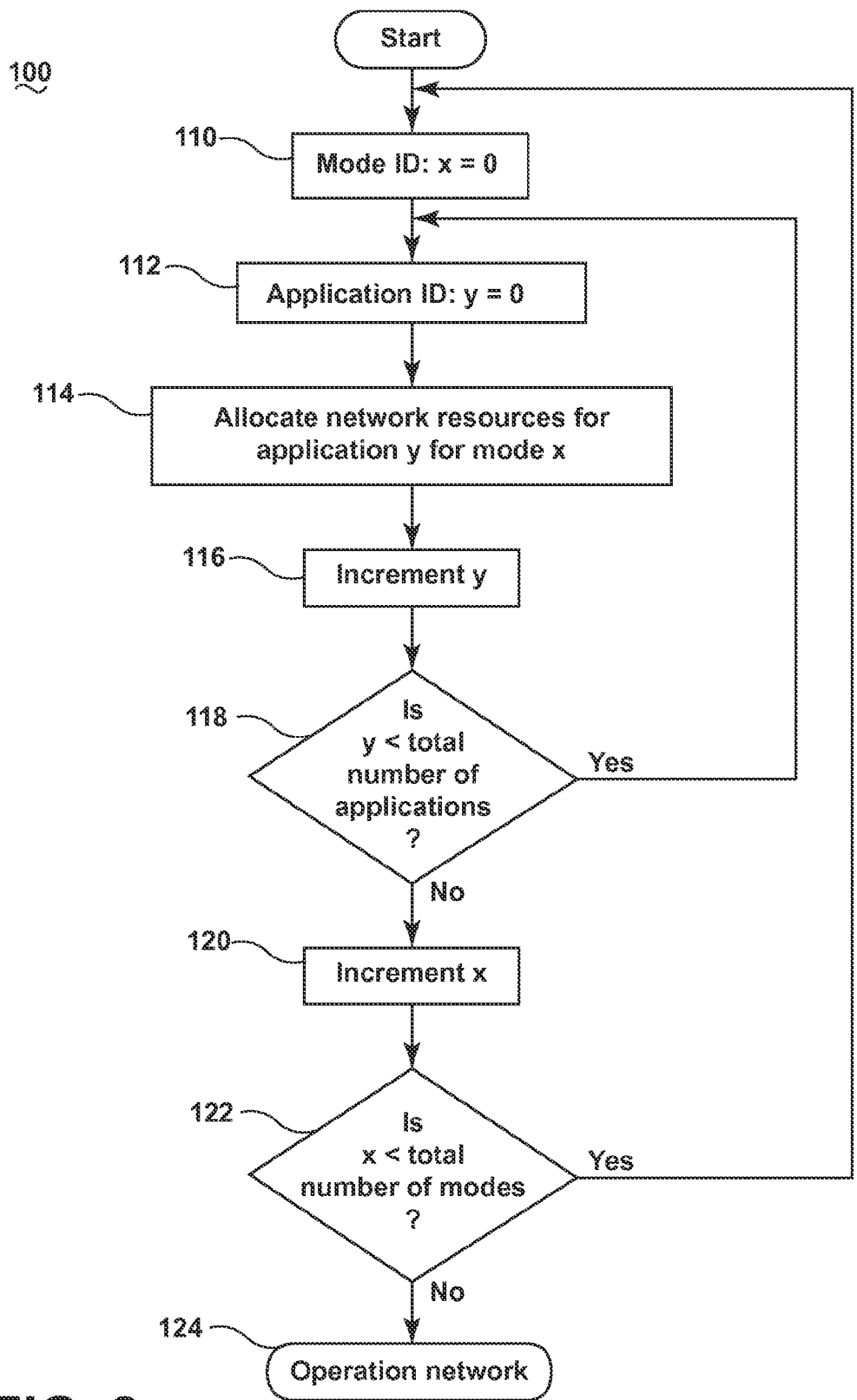
FIG. 2 is a flowchart illustrating a method for allocating resources in an aircraft operations network according to another embodiment of the invention.

FIG. 2 is a flowchart illustrating a method 100 for allocating resources in an aircraft operations network according to another embodiment of the invention. A system integrator may establish a set of modes and a preferred set of applications for each mode. For each application and mode, the system integrator may allocate network resources.

A system integrator may establish a set of modes for the network resource allocation. Starting with a first mode 110, the system integrator may assign a set of applications. Starting with a first application 112, the system integrator may set a network resource allocation 114 for the first application in the first mode. The system integrator may iterate through all the applications 116, 118 for the first mode, allocating network resources. The system integrator may iterate through all modes 120, 122 repeating the allocation of network resources for each application 114 in each mode. Upon completion of the method 100, is the final allocation of network resources is the aggregate of all allocations for all applications in each mode.

After completion of the network resource allocation, the network may be operated 124 in any of the modes including, but not limited to, an in-flight mode, a maintenance mode. The active operating mode of the aircraft operations network 16 in FIG. 1 may be selected by manually switching the operating mode between the configured modes when the operating conditions of the aircraft either change or are expected to change. For example, the operating mode may be switched from a critical in-flight mode when the aircraft is in motion to a maintenance mode when the aircraft is parked on the ground. Other methods of switching may be used depending upon the implementation. Once in maintenance mode, the aircraft operations network 16 from FIG. 1 may maximize use of network resources for transmitting maintenance data including, but not limited to, flight data, engine condition monitoring data, recorder logs, and passenger manifest data.

FIG. 3 is a chart illustrating an example of allocating network resources 200 in an aircraft operations network according to yet another embodiment of the invention. The scenario presented in the chart may demonstrate the network traffic bandwidth allocation for an aircraft operations network 16 from FIG. 1 when two modes labeled as 1 and 2 in the column marked Mode are used for discriminating an in-flight mode and a maintenance mode. In the example chart, Mode 1 may refer to an in-flight mode and Mode 2 may refer to a maintenance mode. All values for bandwidth allocation are listed as a percentage of link utilization, although other indicators for bandwidth allocation would be apparent to one skilled in the art, and this invention should not be construed as limited to link utilization percentage as the only value by which such bandwidth allocation could be performed.

Two operating modes are illustrated in FIG. 3 and labeled as 1 and 2 in the column marked Mode and may be used for discriminating an in-flight mode and a maintenance mode. Mode 1, as an in-flight mode, may indicate an operational configuration designed to meet functional requirements for normal operation and includes all traffic needed for safety critical operation in all operating modes. Mode 2, as a maintenance mode, may indicate a configuration to provide enhanced functionality in a restricted mode of operation. The network traffic indicated by the Mode 2 configuration may include the network traffic that encompasses the safety critical operating mode traffic from the Mode 1 configuration and then may add traffic to provide enhanced functionality of non-critical maintenance data. The enhanced set of network traffic for Mode 2 may contain some non-critical network traffic that had also been allocated for Mode 1. However, enabling the network traffic set for Mode 2 may disable a significant portion of the non-critical network traffic set allocated in Mode 1 because a subset of the additional non-critical network traffic provided in Mode 2 may be mutually exclusive to the non-critical network traffic provided in Mode 1.

Entry and exit to these modes may be controlled by multiple interlocks to ensure safe operation and eliminate incorrect mode selection except under multiple failure scenarios. Network traffic bandwidth allocations may then be modified to give traffic allocations in the two different operating modes. More than two operating modes may be considered but the example is limited to two modes for simplicity.

Most applications and units running applications experience no change between the two different operating modes. In the illustrative example shown in FIG. 3, all applications on the processing module, App #1, App #2, App #3, and App #4 may transmit the same network traffic regardless of operating modes. However, four units running applications 210, 212, 214, 216 demonstrate different network traffic flows in the two different modes, with some network traffic flows reduced and others increased.

In the scenario, the on-the-ground maintenance mode shown as Mode 2 in FIG. 3 may accommodate specific functionality that would not normally be possible in the in-flight mode shown as Mode 1. Specifically, the traffic load to Unit #4 218, designated as a ground-link like a maintenance vehicle 14 in FIG. 1, may be altered significantly to allow considerably more traffic to be routed from the networked unit running applications known as Other Systems #2 116. By employing Modes 1 and 2, Unit #4 118 may enhance the functionality of the airplane operations network 16 from FIG. 1 by establishing an over-allocated network resource. The total network resource allocation for Unit #4 may be significantly above 100% with the additional allocations 220, 222 in Mode 2 from the Other Systems #1 and #2 114, 116 but because the two Modes are preferably not employed simultaneously, the network resource allocation for Unit #4 at any given instant may never exceed 100% in any of the specified network modes.

The examples given in FIG. 3 demonstrate the network resources as allocated by the method of an embodiment of the invention to a set of applications in a first and second mode may exceed the resources such as bandwidth of an aircraft operations network. Other applications, configurations and modes are possible depending upon the specific implementation of the network.

The method of an embodiment of the invention differs from previous attempts to create different operating modes in that in this method, the aggregate of allocated resources exceeds the available network resources and that external means are applied to ensure that in each operating mode, network traffic is disabled such that the aggregate network traffic seen at any time does not exceed the available resources. Therefore, a single network allocation or configuration may be used to suit a number of different operating modes.

One benefit of an embodiment of the invention can be used to enhance the performance or functionality of an aircraft maintenance system in scenarios such as at the departure gate, without impacting the turn-around-time of the aircraft; potentially having a direct positive impact on the aircraft operating costs. Increasing the performance of maintenance, and other low criticality systems, during periods when risk exposure to the aircraft is reduced provides two main advantages. The quantity of data that can be transferred by the low criticality maintenance systems can be increased, thereby expanding the opportunity for such applications as prognostic health monitoring tools where large quantities of data can be used to increase the efficiency and effectiveness of maintenance operations. Second, the time necessary to transfer data to or from the application can be reduced, thereby limiting the period during which the platform is restricted to operating in a reduced criticality mode and increasing the overall efficiency of the system and maximizing the opportunities for revenue generating operation.

While this written description uses examples specifically targeting aircraft operations networks to disclose the invention, other networks with high criticality applications may be applicable. Other networks that may benefit from modal traffic flow reduction are waste water monitoring networks, satellite navigation links, and airframe in-flight monitoring networks.

In this specification, for the purposes of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN), a wide area network (WAN), an Ethernet, a wired computer network, and a wireless network that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include improving the throughput in a deterministic packet-switched network. As well, the method increases the quantity of data that may be transferred by low criticality applications, thereby expanding the opportunity for using such applications as prognostic health monitoring systems where large quantities of data are present. This technique can be used to increase the efficiency and effectiveness of by maximizing network traffic of maintenance operations. By reducing the time necessary to transfer data to or from the low criticality maintenance application, the period during which the aircraft is restricted to a maintenance operation is reduced increasing the overall efficiency of the system and maximizing the opportunities for revenue generating operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for allocation of network resources in a deterministic operations network comprising data transmitting and receiving devices, at least one computer processor, and a plurality of applications communicating data over the deterministic operations network in an aircraft, the deterministic operations network having a bandwidth capacity in at least a first mode or a second mode, the method comprising the steps of:

determining in the at least one computer processor a set of first preferred applications of the plurality of applications for communicating over the deterministic operations network in the first mode and a set of second preferred applications of the plurality of applications for communicating over the deterministic operations network in the second mode;

allocating in the at least one computer processor a first portion of the bandwidth capacity to the set of first preferred applications in the first mode and a second portion of the bandwidth capacity to the set of second preferred applications in the second mode;

selecting the first mode or the second mode for operation of the deterministic operations network; and operating the deterministic operations network via the at least one computer processor according to the allocation wherein the first set of preferred applications uses the first portion of the bandwidth capacity when the deterministic operations network is operating in the first mode and the second set of preferred applications uses the second portion of the bandwidth capacity when deterministic operations network is operating in the second mode of operation.

2. The method of claim 1 wherein the first set of preferred applications has at least one application different than the second set of preferred applications.

3. The method of claim 1 wherein the first set of preferred applications is the same as the second set of preferred applications, but the allocations of the bandwidth capacity differ for at least one of the preferred applications in the first mode and the second mode.

4. The method of claim 1 wherein the first portion of the bandwidth capacity allocated to the set of first preferred applications in the first mode is different than the second portion of the bandwidth capacity allocated to the set of second preferred applications in the second mode.

5. The method of claim 1 and further comprising at least one additional mode that is different from the first mode and the second mode.

6. The method of claim 1 wherein the first portion of the bandwidth capacity allocated to the set of first preferred applications in the first mode and the second portion of the bandwidth capacity allocated to the set of second preferred applications in the second mode exceeds the bandwidth capacity of the deterministic operations network.

7. The method of claim 1 and further comprising providing at least one of a hardware interlock and a logical interlock to enforce operating the deterministic operations network according to the allocation.

8. The method of claim 1 wherein the first portion of the bandwidth capacity allocated to the set of first preferred applications in the first mode and the second portion of the bandwidth capacity allocated to the set of second preferred applications in the second mode is measured by a percentage of network link capacity utilized by a corresponding application on the deterministic operations network.

9. The method of claim 1 wherein the set of first preferred applications of the plurality of applications communicating over the deterministic operations network in the first mode comprises applications necessary to maintain safety-critical operations of the selected environment.

10. The method of claim 1 and further comprising maximizing network traffic for safety-critical operations when the deterministic operations network is operated in the first mode.

11. The method of claim 1 and further comprising maximizing network traffic for maintenance operations when the deterministic operations network is operated in the second mode.

12. The method of claim 1 further comprising transmitting at least one of maintenance data, flight data, engine condition monitoring data, recorder logs, and passenger manifest data when the deterministic operations network is operated in the second mode.

13. The method of claim 1 and further comprising manually switching between the first mode and the second mode when the operating conditions of the selected environment either change or are expected to change.

14. The method of claim 1 and further comprising automatically switching via the at least one computer processor between the first mode and the second mode based upon at least one preselected criterion.

15. The method of claim 1 wherein each of the plurality of applications comprises a computer-implemented process including at least one of an application, a service, a process, a batch, and an executable.

16. The method of claim 1 wherein the deterministic operations network comprises at least one of a LAN, a WAN, an Ethernet, a wired computer network, and a wireless network.

17. The method of claim 1 where the first set of preferred applications and the second set of preferred applications each includes a subset of safety critical applications necessary for basic operation of the selected environment.

18. The method of claim 1 and further comprising analyzing in the at least one computer processor the first and second sets of preferred applications to ensure that each set of preferred applications meets operational requirements specified for each mode of the selected environment.

19. The method of claim 1 wherein the first mode comprises an flight mode and the second mode comprises a maintenance mode.

\* \* \* \* \*